United States Patent [19]

Jahnle

[11] 4,014,970
[45] Mar. 29, 1977

[54] SOLID STATE FORMING OF THERMOPLASTIC MATERIAL

[75] Inventor: Herbert A. Jahnle, Havertown, Pa.

[73] Assignee: The Budd Company, Troy, Mich.

[22] Filed: Aug. 21, 1975

[21] Appl. No.: 606,344

Related U.S. Application Data

[63] Continuation of Ser. No. 464,279, April 25, 1974, abandoned.

[52] U.S. Cl. .............................. 264/161; 264/163; 264/322; 264/323; 264/325
[51] Int. Cl.² .......................................... B29F 5/00
[58] Field of Search .......... 264/322, 325, 320, 323, 264/161, 163

[56] References Cited

UNITED STATES PATENTS

| | | | |
|---|---|---|---|
| 2,953,816 | 9/1960 | Kidder | 264/325 |
| 3,488,747 | 1/1970 | Cleereman | 264/323 X |
| 3,546,221 | 12/1970 | Johnson | 264/322 X |
| 3,621,092 | 11/1971 | Hofer | 264/322 |
| 3,626,053 | 12/1971 | Hofer | 264/322 |
| 3,842,154 | 10/1974 | Lundberg | 264/296 |

OTHER PUBLICATIONS

Fazzari et al., *G R Thermoplastic for Stamping on Ordinary Mechanical Presses*, SPE Journal, Sept. 1972, v. 28, pp. 38 to 42.

Werner et al., *Forging High Molecular Weight Polyethylene*, SPE J., Dec. 1968, vol. 24, pp. 76 to 79.

*Primary Examiner*—Richard R. Kucia
*Attorney, Agent, or Firm*—Hauke & Patalidis

[57] ABSTRACT

A method for solid state forming of thermoplastic material by subjecting a solid blank of the material, preheated to a temperature just below that at which the material is no longer solid, to high compressive strain causing an abrupt flow of the material throughout a mold cavity.

9 Claims, 4 Drawing Figures

SOLID STATE FORMING OF THERMOPLASTIC MATERIAL

This is a continuation of application Ser. No. 464,279, filed Apr. 25, 1974, now abandoned.

BACKGROUND OF THE INVENTION

Various processes are presently used commerically for shaping articles from thermoplastic materials such as polypropylene, polyethylene, and the like. It is common practice to shape a thermoplastic material by heating the material slightly below its melting point and extruding, sheet forming, press-brake forming or forging the material to a required shape. If the material is heated to a temperature exceeding its melting point, the resulting relatively liquid state of the material permits to shape it into an article of desired configuration and dimensions in an appropriate mold by injection molding.

Attempts have been made to form articles from thermoplastic materials at room temperature, but the results achieved have not been very satisfactory. This is due to the fact that, although most thermosplastic materials have relatively good ductility at room temperature, excessive bending and deep drawing create important local strains, which cause breakage and tears and undesired local thinning, and the excessive elastic and plastic strain recovery of the materials create many problems in designing adequate forming tools and in insuring commericially acceptable repeatability in shape accuracy and dimensions in mass production operations. In addition, complex shapes are hard to obtain by room temperature forming.

Articles of complex shape can however be easily obtained with good dimensional stability by injection molding. Unfortunately, injection molding presents many inconveniences and disadvantages, such as high tooling costs and low production rates. The low production rates of injection molding are due to the relatively slow mold opening rates, the time required for allowing the material to flow into the mold and throughout the mold cavity, the time required for permitting the article to solidify and to cool to a temperature low enough to enable it to maintain its shape and be cool enough to handle upon opening of the mold and ejection from the mold, and to the time required for opening the mold and removing the article therefrom.

Solid state molding processes, on the contrary, allow relatively high production rates, and permit utilization of techniques having some similarity with the techniques involved in sheet metal forming. However, conventional techniques of solid state forming of thermoplastic materials are limited in their applications as the amount of material flow is relatively small and generally less than can be achieved in the shaping of metals and these techniques are unable to readily mold parts having varying thicknesses, bosses or ribs.

The process of solid state forming of thermoplastic materials according to the present invention present over prior art solid state molding techniques the advantages of high material flow and high production rates, the ability to form parts with varying thicknesses, bosses and ribs, and presents over injection molding techniques the advantage of relatively low tooling costs and high production rates. The present invention permits to form a solid blank of thermoplastic material to any appropriate shape with a mold closure time of less than 5 seconds. The present invention, in addition, permit to apply to the shaping of thermoplastic materials techniques having some analogy with the techniques used in the forming of metals, with the result that machines and apparatus currently used in metal forming may be readily adapted to the process of the invention, and that high production rates, complicated forms and high material flow are easily achieved by the invention.

SUMMARY OF THE INVENTION

The present invention is the result of the discovery that when a blank of thermoplastic material, maintained at a temperature relatively elevated but still below the temperature at which the material experiences a transition from its "solid" state to its viscous or "plastic" state, is impacted in a mold maintained substantially at room temperature, and is subjected to a compressive strain in the mold, the material abruptyl, and sometimes with a loud report, flows and fills the mold.

The many objects and advantages of the present invention will become apparent to those skilled in the art when the following description of the best mode contemplated for practicing the invention is read in conjunction with the accompanying drawing wherein like reference numerals refer to like parts and in which:

DETAILED DESCRIPTION OF THE PREFERRED EMBODIMENT

The process of the present invention permits to form thermoplastic materials, such as polyolefins such as, for example, polypropylene and polyethylene, from solid state blanks maintained at a temperature preferably just below the temperature at which each material experiences a transition from its solid to its plastic phase. By means of the method of the invention, thermoplastic materials, such as polypropylene, polypropylene filled with talc or glass fibers, and polyethylene, are molded in solid state to diverse shapes from appropriate blanks disposed in a mold maintained at room temperature or at a temperature slightly exceeding room temperature.

In accordance with the present invention, a blank of an appropriate thermoplastic material is made by cutting sheets of the selected material, in thicknesses ranging, for example, from ⅛ to ¾ in., to appropriate dimensions for providing a volume of the material sufficient to completely fill the selected mold cavity or, alternatively, blanks are cut to appropriate thicknesses ranging, for example, from ¼ to ¾ in. from round bars of an appropriate convenient diameter, for example, from bars of 1 to 2 ½ in. diameter. The thermoplastic material may be unfilled, or it may be filled with, for example, talc or glass fibers. Example of materials suitable for practicing the present invention are given at table 1.

TABLE 1

|  | Unfilled[1] Polypropylene | 20% Talc[2] Filled Polypropylene | 20% Glass[3] Filled Polypropylene | 40% Glass[4] Filled Polypropylene |
|---|---|---|---|---|
| Specific Gravity | 0.9–0.91 | 1.2 |  | 1.27 |
| Flexural Strength psi | 6–8000 |  | 7000 | 26,900 |
| Flexural Modulus, psi × 10$^5$ | 1.7–2.4 | 5.75 | 4.0–5.5 | 10.3 |
| Deflection Temperature 264 psi | 125° F to 140° F | 270° F[5] | 260° F to 280° F | 327° F |
| Impact Strength No. Izod ft No./in- unnotched |  |  |  | 11.2[6] |

Figure 1:
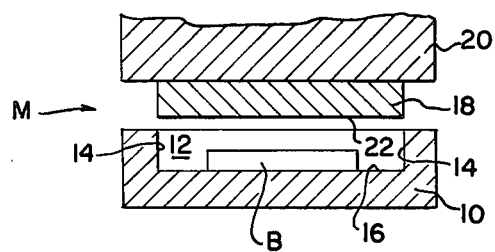
FIG. 1 is a schematic view in section of an example of a simple mold for practicing the method of the present invention.

[1]Modern Plastic Encyclopedia
[2]Amoco Chemicals
[3]Fiberfil Div. of Dart Industries
[4]GRTL Company - P-100 Series Azdel
[5]66 psi
[6]This is for a notched Izod specimen Referring now to FIG. 1, a forming mold M is illustrated as comprising a half mold consisting of a female die block 10 provided with a cavity 12 defined by sidewalls 14 and a bottom rectangular flat surface or platen 16. The female die block 10 is mounted on the bed of a press, such as a hydraulic or a mechanical press, not shown, and thus forms the stationary portion of the mold M. The reciprocable portion of the mold M is defined by a plunger 18 mounted on the end of the press ram 20. The plunger 18 is dimensioned and shaped so as to fit within the female die cavity 12, and has a lower flat surface 22, or platen 22, for engagement with the upper surface of a flat blank B of thermoplastic material disposed on the bottom surface or platen 16 of the female die block 10. Appropriate guiding means, not shown, are provided in a conventional manner for aligning and guiding the plunger 18 relative to the female die block 10. The mold M is made of an appropriate convenient material such as hardened steel.

Means, not shown, are provided for preheating the mold M, and the temperature of the mold may be continuously monitored by means of a surface pyrometer, not shown. The blank B is preheated to a predetermined temperature, as hereinafter explained, and disposed in the female die cavity 12, as shown. During closure of the mold M, pressure is applied to the blank B as a result of reciprocating the plunger 18 into the die cavity 12 until the platen surface 22 impacts upon and engages the upper surface of the blank B. The press in which the mold M is mounted may either be a hydraulic press, permitting to maintain the blank B under pressure between the platens 16 and 22 for a predetermined period of time, up to five seconds for example, which thus corresponds to the mold closure time or dwell time, or a mechanical press modified to stop the ram near bottom dead center for the desired dwell time.

It was discovered that by using the mold M of FIG. 1, moving the movable platen surface 22 at about 2.5 in. per second, or more, at the moment of impacting the upper surface of the blank B preheated to a temperature a few degrees below the melting temperature of the material of the blank, and applying adequate pressure the blank B was caused to abruptly expand, after giving a loud report or "popping" noise, and flow throughout the die cavity filling entirely the cavity during closure of the mold.

EXAMPLE 1

Several runs were made with ⅛ in. thick and ¼ in. thich 1-inch diameter round blanks of polypropylene, preheated to 320° F and placed in the mold M of FIG. 1 mounted in a hydraulic press. The amount of closure of the mold was limited by appropriate shims of diverse thicknesses. Runs were also made without shim, thus permitting the mold to fully close. It was discovered that the ⅛ in. thick blanks remained unaltered when the closure of the mold was limited with shims either 0.030 in. thick or 0.060 in. thick, although blanks placed in an unshimmed mold would pop with a loud report and cause a flow of the blank material which completely filled the mold cavity. The ¼ in. thick blanks were popped, while using the 0.030 inch shim but not while using the 0.060 inch shim. The conclusion drawn from those results was that the so-called popping and high flow characteristics are dependent upon the amount of deformation of the blanks.

EXAMPLE 2

In order to determine the influence of the temperature upon the ability of the blanks to pop and flow throughout the mold cavity, blanks of polypropylene, ¼ in. thick and 1 inch in diameter were tested at diverse temperatures of preheat from 310° to 330° F, at 5° intervals. Three of the samples popped out of 10 samples tested at 310° F. At 315° F nine out of 10 samples popped, and at 320° F all specimens, 20 out of 20, popped. At 330° F, all of the specimens exhibited the high flow characteristics and filled the die cavity but the popping noise was subdued.

The pressure was measured to be in the range of 25,000 psi to 28,300 psi, and the temperature of the mold was maintained below 150° F.

EXAMPLE 3

Optimum mold temperatures were investigated, using unfilled polypropylene rectangular blanks cut from sheet material. The mold was preheated to 200° F, and the blanks were preheated to 315° F. Several specimen blanks of ⅛ and ¼ in. thickness were compressed successively in the mold, while the mold was allowed to cool and its temperature was monitored with the surface pyrometer. The results achieved are tabulated in Table 2.

Large flow of the material occurred with a popping noise only when the mold temperature was below 140° F. After examining the molded specimens, and examining the results of the test, an explanation for the mold temperature effect was postulated. When the mold is too hot, that is above 140° F, for the polypropylene blank the surface of the blank remains warm and relatively weak. Therefore, when the mold is hot the surface of the blank deforms at almost the same rate as the interior of the blank. However, when the mold is cold, a strong skin forms on the blank surface in engagement with the cool mold surface, and the skin does not move or flow as readily as the interior blank material which, in view of its temperature slightly below the liquidification temperature of the material, becomes liquid as a result of the high strain occurring in the blank. When the internal pressure of the material within the blank reaches a value high enough to rupture the blank skin not engaged with a mold wall, the skin is ruptured and large flow of the material occurs throughout the mold cavity. The breaking of the blank skin is generally accompanied by a loud report or popping noise.

Based on the results achieved, it was determined that the center of the compressed blanks is plasticized by the compressive strain energy imparted to the blank, and that the outer colder skin of the blank contains the plasticized material until the internal pressure is high enough to rupture the skin.

EXAMPLE 4

The tests of Example 3 were repeated on polyethylene blanks. It was found that large flow throughout the mold cavity could be obtained by preheating the blanks in the temperature range of 160° (71° C) to 265° F (130° C), and by maintaining the mold at room temperature.

EXAMPLE 5

The effect of filler and reinforcement material in polypropylene on the ability to obtain large flow was explored. Polypropylene extrusion pellets were mixed with 20% talc and compression molded into 1 in. and 1 ¼ in. round bars, 1 in. long, in a laboratory metallographic press. Other blanks were prepared in the same manner but using a 20% glass fiber (¼ in. long glass fibers) and a 40% glass fiber fill in polypropylene, respectively.

The blanks so prepared demonstrated a large flow behavior quite similar to the behavior of the unfilled polypropylene blanks of Example 3. However, a reduction in the pressure required to cause the blanks to pop and flow at a given preheat temperature was noted, over the pressure required to close the mold and cause the material to flow when using unfilled polypropylene blanks.

Figure 2:
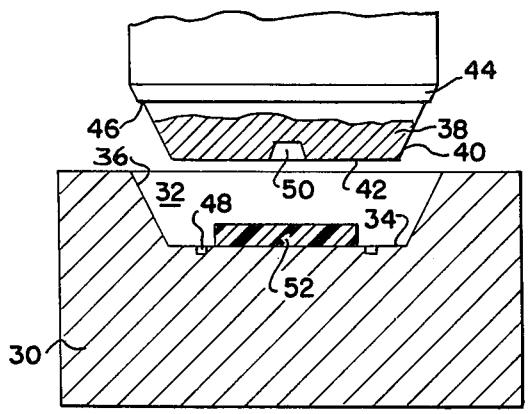
FIG. 2 is a schematic view, partly in elevation and partly in section, of an example of mold for practicing the method of the invention, for molding a cup-shaped thermoplastic article, with a blank of thermoplastic material disposed in the mold.

Multiple layers of ⅛ in. thick filled unfilled polypropylene sheets to a total thickness of ¼ to ½ in., when placed in the mold of FIG. 2 and compacted under the conditions of Example 3, exhibited large flow with fairly good interlayer fusion. Blanks consisting of multiple layers to a total thickness of ¼ to ½ in. of polypropylene glass fiber filled ⅛ in. thick sheets, the glass fibers having a length greater than 2 in. (sold under the trademark Azdel by the GRTL Co.) also exhibited large flow characteristics, the material entirely filling the mold cavity.

Examples 1 through 5 were effected by means of a mold as schematically illustrated at FIG. 1, mounted in a 150 ton hydraulic press providing a fairly constant Table 2

| Specimen | Thickness | Blank Temp. | Mold Temp. | Results |
|---|---|---|---|---|
| 1 | ⅛ in. | 315° F<br>157.2° C | 200° F<br>93.3° C | no popping<br>no flow |
| 2 | ⅛ in. | 315° F<br>157.2° C | 180° F<br>82.2° C | no popping<br>no flow |
| 3 | ⅛ in. | 315° F<br>157.2° C | 170° F<br>76.6° C | no popping<br>no flow |
| 4 | ⅛ in. | 315° F<br>157.2° C | Room temp. | popping<br>good flow |
| 5 | ¼ in. | 315° F<br>157.2° C | 140° F<br>60° C | popping<br>fair flow |
| 6 | ¼ in. | 314° F<br>156.7° C | 125° F<br>51.7° C | popping<br>good flow |
| 7 | ¼ in. | 311° F<br>155° C | 120° F<br>48.9° C | popping<br>excellent flow |
| 8 | ¼ in. | 314° F<br>156.7° C | 115° F<br>46.1° C | popping<br>excellet flow |
| 9 | ⅛ in. | 315° F<br>157.2° C | 200° F<br>68.3° C | no popping<br>no flow |
| 10 | ⅛ in. | 315° F<br>157.2° C | 155° F<br>68.3° C | no popping<br>no flow |
| 11 | ⅛ in. | 315° F<br>157.2° C | 130° F<br>54.5° C | popping<br>good flow |
| 12 | ⅛ in. | 315° F<br>157.2° C | 115° F<br>46.1° C | popping<br>excellet flow |
| 13 | ⅛ in. | 315° F<br>157.2° C | 105° F<br>40.5° C | popping<br>excellent flow |
| 14 | ⅛ in. | 315° F<br>157.2° C | 100° F<br>37.8° C | popping<br>excellent flow | ram speed of 2.5 in. per second to bottom, under full load.

A 400 ton knuckle press, identical to conventional mechanical presses used for stamping and forming sheet metal parts, was utilized for operating a mold according to FIG. 1 in the following examples:

EXAMPLE 6

Blanks were made by cutting unfilled polypropylene bars, 1 ¼ in. in diameter, to lengths of ¼, ½ and ¾ in. After preheating the blanks in an oven to 310°–315° F, one specimen of each length was compressed. The press was set up such as to provide some flow of material even when ¼ in. thick blanks were placed in the mold. After each run of a set of three specimens, one of each thickness, the shut height of the press was decreased, and consequently the spacing between the platens 16 and 22 of the mold of FIG. 1 was decreased, and thus the degree of compression of the blanks was increased. The shut height of the press was decreased by shimming the lower platen 16 (FIG. 1) with a 0.060 in. steel sheet placed between the block 10 and the bed of the press. Another set of three blanks of different initial heights was then compressed and each final thickness measured. The shut height of the press was again adjusted by adding another 0.060 in. steel sheet below the lower platen, and another set of three blanks was compressed, and so on until a total of six runs was obtained, one without shim and five with consecutively increasing shims.

The final thicknesses obtained for each run are tabulated in Table 3. Some flow of material was obtained from all the specimens, the flow of material being quantatively related to amount of reduction in thickness of the original blanks.

TABLE 3

Temperature: 310° – 315° F (154.5 – 157.2° C)
Specimen size: 1¼ in. diameter - various heights
Material: Unfilled Polypropylene

| Specimen | Final Thickness Corresponding to Different Initial Heights | | |
|---|---|---|---|
| | ¼" | ½" | ¾" |
| 1 | .202" | .230" | .235" |
| 2 | .175" | .190" | .200" |
| 3 | .136" | .142" | .150" |
| 4 | .100" | .108" | .112" |
| 5 | .078" | .080" | .090" |
| 6 | .040" | .048" | .058" |

All No. 6 specimens had large flow.

EXAMPLE 7

Large blanks of unfilled polypropylene, in the range of 1 ¼ to 2 in. in diameter, and in the range of ¼ to 1 ¼ in. in initial heighth, preheated to a temperature of 310° – 315° F, were compressed in the mold, and all exhibited large flow. The results achieved are tabulated in Table 4.

TABLE 4

Temperature: 310° – 315° F (154.5 – 157.2° C)
Material: Unfilled Polypropylene

| Diameter | Final Thicknesses Corresponding to Different Initial Heights | | | | |
|---|---|---|---|---|---|
| | ¼" | ½" | ¾" | 1" | 1½" |
| 1¼" | .040" | .048" | .058" | .065" | .067" |
| 1½" | .045" | .055" | .065" | .075" | .080" |
| 1¾" | .047" | .057" | .067" | .075" | |
| 2" | .050" | .060" | .066" | .080" | |

All specimens exhibited large flow.

EXAMPLE 8

Blanks in the shapes of cubes and rectangular parallelepipeds having heights varying from ⅛ to 1 in. and lengths and widths varying from ½ to 9 inches with surface areas (length × width) up to 25 square inches were compressed under the conditions stated in the previous examples and all exhibited the high abrupt flow characteristics. These results indicate that the blank geometry can be varied considerably arriving at similar high flow characteristics as long as the blank temperature, the compressive strain and the mold temperature conditions are met.

Diffraction Laue'X-ray patterns were made of the blanks and of the formed parts. It was noted that while the same crystaline patterns exist in the material before and after compression, the molded material possesses a greater degree of orientation.

By way of the process of the invention, thermoplastic materials may be molded in complex shapes. As an illustration of complex shapes which can be obtained, reference is made to a mold according to FIG. 2 for molding a cup-shaped article. The mold of FIG. 2 comprises a mold half consisting of a hardened steel block 30 provided with an appropriately shaped and dimensioned female die cavity 32. In the example illustrated, the female die cavity 32 is provided with a flat circular bottom surface 34 and with a frusto-conical sidewall 36. The second half, or male portion, of the mold is in the form of a mandrel member 38 having a frusto-conical peripheral surface 40 of the same taper as the corresponding taper of the frusto-conical wall 36 of the female die portion 32. The mandrel 38 has a flat circular end face 42 at its bottom end, and is provided with a slightly enlarged frusto-conical peripheral surface 44 such that an annular surface 46 is defined between the frusto-conical peripheral surfaces 40 and 44. The bottom surface 34 of the female die block 30 is provided with an annular groove 48, and a frusto-conical recess 50 is disposed substantially at the center of the mandrel end surface 42.

The mold of FIG. 2 is made according to techniques generally used for making dies for shaping sheet metal articles, and is mounted on an appropriate conventional die set having conventional guide posts and bushings, not shown, providing an appropriate guiding and alignment means for the mandrel 38 relative to the female die block 30. The die set is mounted on a conventional metal forming press, hydraulic press or knuckle press, as pecedently explained.

For the purpose of practicing the present invention, a blank 52 of thermoplastic material, such as unfilled polypropylene, polypropylene filled with talc, glass fibers, or the like, polyethylene, etc., preheated to a temperature slightly below the melting point of the thermoplastic material, is placed, as shown at FIG. 2, on the bottom surface 34 of the female die cavity 32.

Figure 3:
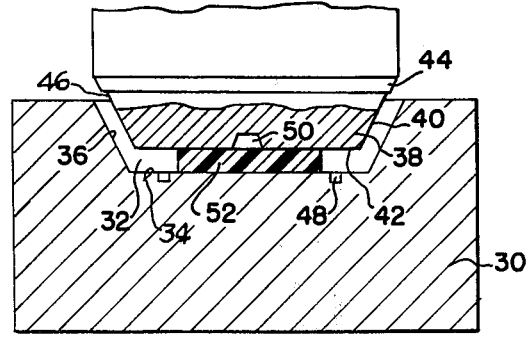
FIG. 3 is a view similar to FIG. 2, but showing the mold partly closed with the blank being subjected to compressive strain.
Figure 4:
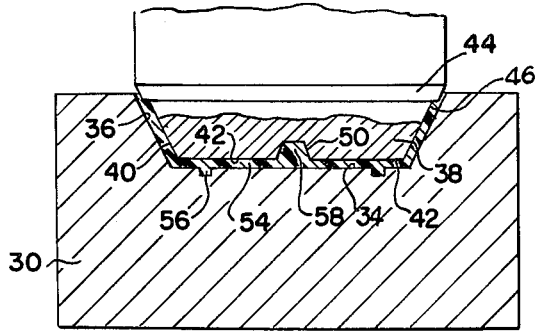
FIG. 4 is a view similar to FIG. 3, but showing the mold fully closed and the thermoplastic material completely filling the mold cavity.

The die block 30 and the mandrel 38 are maintained substantially at room temperature or at a temperature preferably not exceeding 140° F, and the mold is closed by reciprocating the ram of the press, thus causing the mandrel 38 to be displaced within the female die cavity 32, until the end face 42 of the mandrel engages the upper surface of the blank 52 as illustrated at FIG. 3. Further displacement of the mandel end face 42 towards the cavity bottom surface 34 places the blank 52 under considerable internal pressure strain which causes the inner material of the blank to become fluid enough to flow, upon rupture of the blank skin, throughout the cavity 32 between the surfaces 42 and 40 of the mandrel 38 and the surfaces 34 and 36 of the female die block 30, respectively. Upon full closure of the mold, as illustrated at FIG. 4, the material of the blank having flowed throughout the space between the male and the female portion of the mold, has taken the shape of the desired cup-shaped article 54 provided with an appropriate annular reinforcing rib 56 and an inner central boss 58. Any excess material, during the final step of the die closure, which tends to exude by overflow from the mold cavity is squeezed at the edge of the cavity by the enlarged diameter frusto-conical portion 44 of the mandrel tending to engage the upper edge of the frusto-conical surface 36 of the die cavity. In most cases the frictional and shearing effect of the two surfaces in opposite relative displacement is sufficient to cleanly shear the flash from the edge of the cup-shaped part 54, or the flash or offal may be removed in a secondary operation.

The mold of FIG. 2 has been successfully used for forming cup-shaped articles from thermoplastic materials such as filled and unfilled polypropylene and polyethylene, according to the method of the present invention. Such cup-shaped articles were formed with a smaller diameter of 3 in. and a larger diameter of 4 in., with a wall thickness of approximately 0.060 in., a 0.060 in. deep annular rib 56, and a boss 58 ½ in. in diameter at the base, 0.40 in. at the top and ¼ in. high. Diverse size blanks were used, including blanks as small as 1 ¼ in. in diameter and as high as 1 ⅛ in.

When using polypropylene blanks, the blanks were preheated to 320°–330° F, and the tonnage required on a hydraulic press was 30 tons for filled polypropylene and 90 tons for unfilled polypropylene. It was found that the best results are achieved with blanks which are relatively thick, such as blanks 1 ¼ in. in diameter and 1 ⅛ in. high. When the blanks are preheated to a temperature equal to or higher than the material melting point, the blanks stick to various degrees to the oven shelves and the transfer tongs. The best results are achieved when the blanks are preheated to a temperature a few degrees below the melting point of the material and when the mold is maintained at room temperature or at a temperature close to room temperature.

It was also discovered that the best results are also achieved when the closure speed of the mold is relatively high. In other words, best results are achieved by mounting the mold in a press providing a relatively high ram velocity at the instant of engagement of the moving platen surface with the blank surface. A ram velocity of the order of 2.5 in. per second (6.4 cm per second) or more is preferred.

While specific embodiments of the invention have been illustrated and described, it will be readily apparent to those skilled in the art that the foregoing disclosure is given by way of illustrative examples only, rather than by way of limitation, and that without departing from the invention, the details may be varied within the scope of the appendent claims.

What is claimed is:

1. A method of solid state forming an article or thermoplastic material, said method comprising:
    heating a blank of said thermoplastic material to a temperature proximate to and below the temperature at which said material experiences a transition from its solid to its plastic phase;
    placing said blank heated at said temperature in an open mold between a rigid portion thereof displaceable relative to another rigid portion thereof, said blank having a surface area relatively smaller than the surface area of said mold and a volume relatively larger than the volume of the mold cavity defined when said mold is closed;
    maintaining said mold at room temperature;
    displacing one of said rigid portions of said mold relative to the other rigid portion of said mold at a relative velocity of at least 6.4 cm per second for impacting said blank and placing said blank under compressive strain and causing a substantial decrease in thickness of said blank;
    maintaining said blank in said mold under said compressive strain for less than 5 seconds for causing said blank to abruptly expand between said mold rigid portions and the material of said blank to flow and fill said mold cavity for forming said article, with the excess of said material exuding from said mold cavity forming a flash;
    allowing said article to cool sufficiently to remove from said mold without distorting said article; and removing said flash.

2. The method of claim 1 wherein said flash is removed by shearing at the edge of said mold during closure.

3. The method of claim 1 wherein said mold is maintained at a temperature below 60° C.

4. The method of claim 1 wherein said material is polypropylene and the temperature at which said blank is heated is in the range of 154° to 160° C.

5. The method of claim 3 wherein said material is 20% talc filled polypropylene.

6. The method of claim 3 wherein said material is 20% glass fiber filled polypropylene.

7. The method of claim 3 wherein said material is 40% glass fiber filled polypropylene.

8. The method of claim 1 wherein said material is polyethylene and the temperature at which said blank is heated is in the range of 71° to 130° C.

9. The method of claim 1 wherein said mold is mounted on a press.

* * * * *